US010253713B2

(12) United States Patent
Riepl

(10) Patent No.: US 10,253,713 B2
(45) Date of Patent: Apr. 9, 2019

(54) METHOD AND APPARATUS FOR DETECTING A MALFUNCTIONING RAIL PRESSURE SENSOR

(71) Applicant: Continental Automotive GmbH, Hannover (DE)

(72) Inventor: Hans Riepl, Hemau (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 269 days.

(21) Appl. No.: 15/328,167

(22) PCT Filed: Jun. 24, 2015

(86) PCT No.: PCT/EP2015/064183
§ 371 (c)(1),
(2) Date: Jan. 23, 2017

(87) PCT Pub. No.: WO2016/012178
PCT Pub. Date: Jan. 28, 2016

(65) Prior Publication Data
US 2017/0218873 A1 Aug. 3, 2017

(30) Foreign Application Priority Data
Jul. 23, 2014 (DE) .................. 10 2014 214 452

(51) Int. Cl.
F02D 41/22 (2006.01)
F02M 55/02 (2006.01)
(Continued)

(52) U.S. Cl.
CPC ......... F02D 41/222 (2013.01); F02M 55/025 (2013.01); G01M 15/09 (2013.01);
(Continued)

(58) Field of Classification Search
CPC ............ F02D 41/222; F02D 2041/223; F02D 2200/0602; F02D 2041/285;
(Continued)

(56) References Cited

U.S. PATENT DOCUMENTS 7,143,747 B2 * 12/2006 Uchiyama ............ F02D 41/222
123/456
7,275,425 B2 10/2007 Buck et al. ................. 73/114.61
(Continued)

FOREIGN PATENT DOCUMENTS

DE 102008043413 A1 5/2010 ............ F02D 41/22
DE 102012219377 A1 4/2014 ............ G08C 25/00
(Continued)

OTHER PUBLICATIONS

International Search Report and Written Opinion, Application No. PCT/EP2015/064183, 21 pages, dated Sep. 9, 2015.

Primary Examiner — Muhammad Shafi
(74) Attorney, Agent, or Firm — Slayden Grubert Beard PLLC

(57) ABSTRACT

The present disclosure relates to internal combustion engines and the teachings thereof may be embodied in methods and apparatus for detecting a malfunctioning rail pressure sensor. Some embodiments may include a method for detecting a malfunctioning rail pressure sensor comprising: delivering an analog output signal characterizing the rail pressure to a control unit; generating a differential rail pressure signal as a digital output signal; delivering the differential rail pressure signal of the rail pressure sensor to the control unit; analyzing the analog output signal and the differential rail pressure signal in the control unit; and detecting a malfunctioning rail pressure sensor based on the analysis by the control unit.

11 Claims, 1 Drawing Sheet

(51) Int. Cl.
*G01M 15/09* (2006.01)
*F02D 41/28* (2006.01)

(52) U.S. Cl.
CPC .. *F02D 2041/223* (2013.01); *F02D 2041/283* (2013.01); *F02D 2041/285* (2013.01); *F02D 2200/0602* (2013.01); *Y02T 10/40* (2013.01)

(58) Field of Classification Search
CPC ............ F02D 2041/283; G01M 15/09; F02M 55/025; Y02T 10/40
USPC ........................................................ 701/30.5
See application file for complete search history.

(56) References Cited

U.S. PATENT DOCUMENTS

| | | | | |
|---|---|---|---|---|
| 8,725,391 | B2* | 5/2014 | Hofmeister | F02D 41/062 |
| | | | | 123/479 |
| 2006/0054149 | A1* | 3/2006 | Uchiyama | F02D 41/222 |
| | | | | 123/676 |
| 2013/0125862 | A1* | 5/2013 | Sahashi | F02D 41/222 |
| | | | | 123/447 |
| 2015/0159574 | A1* | 6/2015 | Stack | F02D 41/222 |
| | | | | 701/104 |

FOREIGN PATENT DOCUMENTS

| | | | | |
|---|---|---|---|---|
| JP | 112148 | A | 1/1999 | ............ F02D 41/22 |
| WO | 2004/040104 | A1 | 5/2004 | ............... F01N 7/00 |
| WO | 2016/012178 | A1 | 1/2016 | ............ F02D 41/22 |

* cited by examiner

METHOD AND APPARATUS FOR DETECTING A MALFUNCTIONING RAIL PRESSURE SENSOR

CROSS-REFERENCE TO RELATED APPLICATIONS

This application is a U.S. National Stage Application of International Application No. PCT/EP2015/064183 filed Jun. 24, 2015, which designates the United States of America, and claims priority to DE Application No. 10 2014 214 452.3 filed Jul. 23, 2014, the contents of which are hereby incorporated by reference in their entirety.

TECHNICAL FIELD

The present disclosure relates to internal combustion engines and the teachings thereof may be embodied in methods and apparatus for detecting a malfunctioning rail pressure sensor.

BACKGROUND

Common-rail injection systems are equipped with a rail pressure sensor for determining the injection pressure and used in control of the injection pressure. Said rail pressure sensor is, therefore an essential component of a common-rail injection system, which inter alia contributes to complying with maximum permissible values for the emissions that occur and the fuel consumption. A malfunction of said rail pressure sensor would result in a significant emission and drivability degradation and would constitute a safety risk.

In the event of a sensor malfunction with which too low a pressure is measured, an existing pressure control circuit would increase the injection pressure and thus the rail pressure, perhaps to a critical pressure level. As a result, mechanical components of the common-rail injection system would be overloaded, so that for example a fuel leak can occur. Consequently, it is necessary to detect the presence of a rail pressure sensor defect and place an associated fault signal in a fault memory to indicate the source of the fault to service staff and to enable suitable countermeasures to be taken.

It is already known to perform a pressure equalization with ambient pressure when the common-rail injection system is unpressurized for detecting a rail pressure sensor defect. But this type of detection can only be performed before the start of the respective engine and gives no indication of whether the pressure measurement value provided by the rail pressure sensor is correct or not in the entire measurement range, for example at a system pressure of 1500 bar. Said type of detection also provides no information about any drifting of the measurement values provided by the sensor and also no information about any characteristic curve gradient errors.

Furthermore, it is also known to carry out a redundant version of the rail pressure measurement by means of two rail pressure sensors and to continuously compare the measurement values obtained in the entire sensor measurement range with each other for detecting a defect of a rail pressure sensor. If the obtained measurement values deviate from each other, then the presence of a malfunction is detected and necessary countermeasures can be initiated. Such a redundant version of the rail pressure measurement is however difficult to implement for structural reasons and furthermore causes comparatively high costs.

An analysis of the rail pressure measurement signals provided by a rail pressure sensor is generally carried out in a control unit connected to the rail pressure sensor, to which the rail pressure measurement signals provided by the rail pressure sensor are delivered. One possibility is transmitting the rail pressure measurement signals that are provided by the rail pressure sensor to the control unit in digital form. However, the high data rates that are required by the injection system for pressure control cannot be achieved by means of such a digital transmission.

An alternative possibility is transmitting the rail pressure measurement signals provided by the rail pressure sensor to the control unit in the form of analog signals. Said analog transmission does not however give the possibility of a manipulation lock for the purpose of making difficult or preventing tuning of the rail pressure sensor to achieve an engine performance increase.

A method and an apparatus for plausibility checking the output signal of a rail pressure sensor are known from DE 10 2008 043 413 A1. With said known method, an analog signal of a rail pressure sensor characterizing the rail pressure is delivered to a control unit and processed there. Furthermore, an additional digital signal characterizing the rail pressure is output by the rail pressure sensor and is compared with the analog signal in the control unit for plausibility checking of the analog signal characterizing the rail pressure.

SUMMARY

The teachings of the present disclosure enable methods and an apparatus for detecting a malfunctioning rail pressure sensor, with which the detection provides more reliable results.

Some embodiments may include a method for detecting a malfunctioning rail pressure sensor, with which an analog output signal of the rail pressure sensor characterizing the rail pressure and a digital output signal of the rail pressure sensor are delivered to a control unit and are analyzed in the control unit, characterized in that a differential rail pressure signal is output by the rail pressure sensor (13) as a digital output signal and is delivered to the control unit (17) and that the differential rail pressure signal is used in the control unit (17) for detecting the malfunctioning rail pressure sensor.

In some embodiments, a comparison of the transmitted differential rail pressure signal with a predetermined threshold value is carried out in the control unit (17) and that the control unit detects the presence of a malfunctioning rail pressure sensor if the transmitted differential rail pressure signal exceeds the predetermined threshold value.

In some embodiments, generation of the differential of the output signals of two rail pressure measurement values, each output by a rail pressure measurement device (18, 18a, 19; 18, 18b, 20), is carried out in the rail pressure sensor (13).

In some embodiments, generation of the differential of the output signals of two rail pressure measurement values detected at the same time is carried out in the rail pressure sensor (13).

Some embodiments may include an apparatus for detecting a malfunctioning rail pressure sensor, comprising a rail pressure sensor (13) and a control unit (17) connected to the rail pressure sensor, wherein the rail pressure sensor (13) comprises a first and a second rail pressure measurement device and is designed to output an analog signal characterizing the rail pressure and a digital signal and the control unit (17) is designed to receive and to analyze the analog signal output by the rail pressure sensor (13) and the digital signal output by the rail pressure sensor (13), characterized in that the rail pressure sensor (13) furthermore comprises a rail pressure differentiator (21) that forms a differential rail pressure signal from the output signal of the first rail pressure measurement device (18,18a,19) and the output signal of the second rail pressure measurement device (18,18b,20), the rail pressure sensor (13) outputs the differential rail pressure signal as a digital signal to the control unit and the control unit (17) is designed to analyze the differential rail pressure signal.

In some embodiments, the first and the second rail pressure measurement devices each comprise a measurement transducer (18a,18b).

In some embodiments, the first and the second rail pressure measurement devices each comprise an ASIC (19,20).

In some embodiments, the rail pressure sensor (13) comprises a digital to analog converter (22) that is connected to the output of the first rail pressure measurement device (18,18a,19) and that provides the analog signal output by the rail pressure sensor.

In some embodiments, the control unit (17) comprises a filter (23), an analog to digital converter (24) connected to the output of the filter and a computing unit (25) for analyzing the received analog signal.

In some embodiments, the control unit (17) comprises a computing unit (26) that is designed for analyzing the differential rail pressure signal.

In some embodiments, the computing unit (26) is designed to compare the differential rail pressure signal with a predetermined threshold value and to detect the presence of a malfunctioning rail pressure sensor if the differential rail pressure signal exceeds the predetermined threshold value.

BRIEF DESCRIPTION OF THE DRAWINGS

The teachings of the present disclosure are described in detail below using the drawings by way of example. In the drawings.

DETAILED DESCRIPTION

An example method for detecting a malfunctioning rail pressure sensor may include delivering an analog signal of the rail pressure sensor characterizing the rail pressure and a digital output signal of the rail pressure sensor to a control unit and analyzing the signal in the control unit. The digital signal output by the rail pressure sensor is a differential rail pressure signal that is determined in the rail pressure sensor. This is delivered to the control unit and is used there for detecting a malfunctioning rail pressure sensor.

An example apparatus for detecting a malfunctioning rail pressure sensor comprises a rail pressure sensor and a control unit connected to the rail pressure sensor. The rail pressure sensor contains first and second rail pressure measurement devices and is designed to output an analog signal characterizing the rail pressure and a digital signal. The control unit is designed to receive and analyze the analog signal output by the rail pressure sensor and the digital signal output by the rail pressure sensor. The rail pressure sensor also comprises a rail pressure differentiator that forms a differential rail pressure signal from the output signal of the first rail pressure measurement device and the output signal of the second rail pressure measurement device. The rail pressure sensor outputs the differential rail pressure signal as a digital signal. The control unit is designed to analyze the differential rail pressure signal.

Comparing the transmitted differential rail pressure signal with a predetermined threshold value may be performed in the control unit. The control unit detects a malfunctioning rail pressure sensor if the transmitted differential rail pressure signal exceeds the predetermined threshold value. The rail pressure sensor may comprise two rail pressure measurement devices that each output a rail pressure measurement value. The differential rail pressure signal is calculated from said two rail pressure measurement values, which may be determined at the same time by the rail pressure measuring devices.

Figure 1:
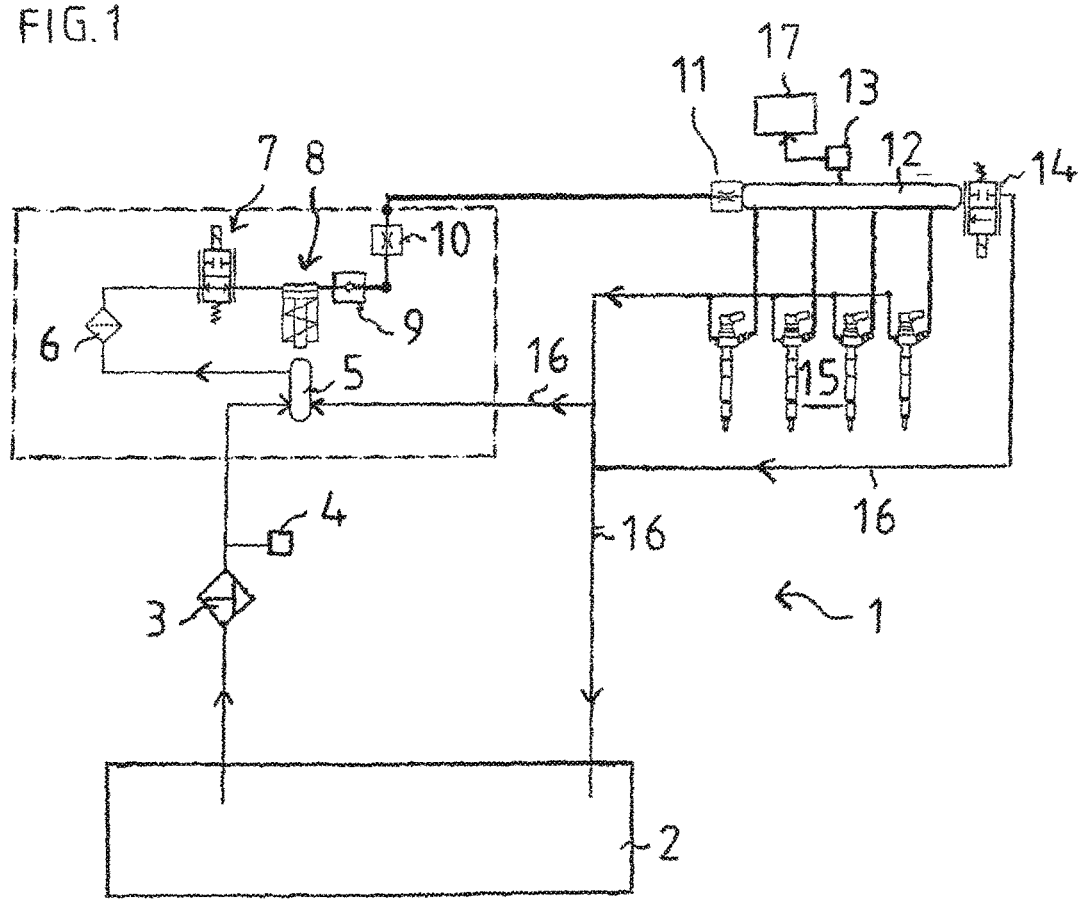
FIG. 1 shows a block diagram of a common-rail injection system.

FIG. 1 shows a block diagram of a common-rail injection system 1. Said common-rail injection system 1 includes a fuel tank 2, from which fuel is pumped during operation of the system and is delivered by means of a fuel filter 3 to a pump unit that is bounded by dashed lines in FIG. 1. A temperature sensor 4, by means of which the temperature of the fuel is measured, may be positioned between the fuel filter 3 and the pump unit.

In the pump unit, the fuel provided via the fuel filter 3 is delivered to a low-pressure chamber 5, which furthermore is connected to a fuel return line 16. The fuel output from the low-pressure chamber 5 is delivered via a pump filter 6 and an inlet valve 7 to a high-pressure pump 8 and is brought to a high pressure by means of said pump. The high-pressure fuel output by the high-pressure pump 8 is delivered to a rail 12 via an outlet valve 9 and an outlet choke 10. As an alternative to the outlet choke 10, an inlet choke 11 can be used upstream of the rail 12. The rail 12 is connected by means of a pressure discharge valve 14 to the fuel return line 16, via which fuel can be delivered back into the fuel tank 2 and/or the low-pressure chamber 5.

Furthermore, a rail pressure sensor 13 for the measurement of the fuel pressure occurring in the rail 12 is coupled to the rail 12. The output signals of the rail pressure sensor 13 are delivered to a control unit 17, which analyzes said signals and controls the injection processes of the common-rail injection system while taking into account the analyzed output signals of the rail pressure sensor 13.

In the example shown, the rail 12 is connected to a total of four injection valves 15, the opening and closing processes of which are controlled by the control unit 17 by means of suitable control signals, wherein said control signals are determined in the control unit 17 taking into account the output signals provided by the rail pressure sensor 13 and further signals that are not shown in FIG. 1. With the common-rail injection system represented in FIG. 1, it is important that a malfunctioning rail pressure sensor can be detected rapidly and reliably, so that suitable countermeasures can be initiated.

Figure 2:
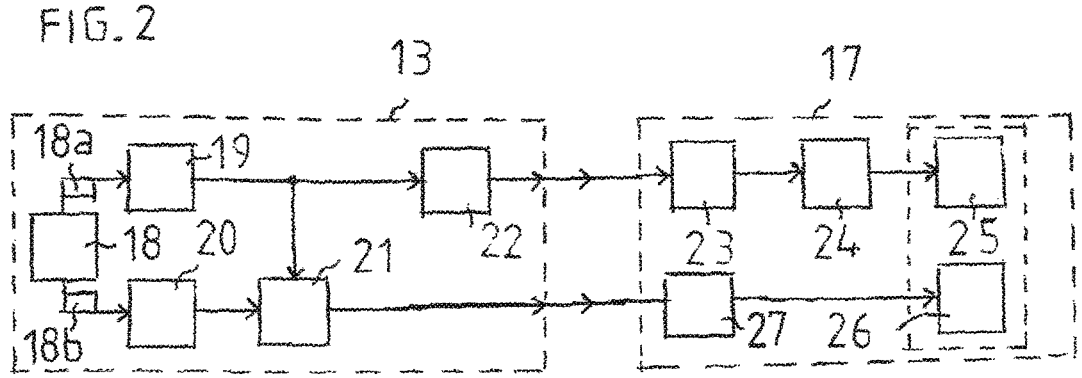
FIG. 2 shows a block diagram describing an exemplary embodiment for the method according to the teachings of the present disclosure as well as an example apparatus.

FIG. 2 shows a block diagram of an apparatus for such rapid and reliable detection of a malfunctioning rail pressure sensor. Said apparatus comprises a rail pressure sensor 13 and a control unit 17 connected to the rail pressure sensor.

The rail pressure sensor 13 contains a first rail pressure measurement device and a second rail pressure measurement device. The first rail pressure measurement device comprises a sensor membrane 18, a first measurement transducer 18a, and a first ASIC 19. The second rail pressure measurement device comprises the sensor membrane 18, a second measurement transducer 18b and a second ASIC 20. A first rail pressure measurement signal is provided at the output of the ASIC 19, a second rail pressure measurement signal at the output of the ASIC 20. The measurement transducers can be Wheatstone measurement bridges with strain gauges (DMS).

A differential rail pressure signal is calculated from said two rail pressure measurement signals by means of the rail pressure differentiator 21. Said differential rail pressure signal is available at the output of the rail pressure differentiator 21, is provided at an output of the rail pressure sensor 13, and is transmitted from there to the control unit 17 as a digital signal via a transmission path. The differential rail pressure signal, which is not a pressure value, e.g., not a digital signal characterizing the rail pressure, but a fault variable, is received there by a signal input unit 27 and passed on from the output thereof to a computing unit 26.

Said computing unit is designed to analyze the differential rail pressure signal. During said analysis of the differential rail pressure signal, the computing unit 26 compares the differential rail pressure signal with a predetermined threshold value and detects the presence of a malfunctioning rail pressure sensor if the differential rail pressure signal exceeds the predetermined threshold value.

The output signal of the ASIC 19 is furthermore also delivered to a digital to analog converter 22 and is converted in the same into an analog signal. Said analog signal is provided at the output of the digital to analog converter 22 and at a further output of the rail pressure sensor 13. From there it is transmitted via a further transmission path to the control unit 17. In the control unit 17, the transmitted analog signal, which is an analog signal characterizing the rail pressure, is delivered via a noise filter 23 to an analog to digital converter 24 and is converted in the same into a digital signal. The digital signal provided at the output of the analog to digital converter 24 is delivered to a computing unit 25 for further analysis.

The computing units 24 and 25 can be a computing device comprising a plurality of computing units or computing modules—as indicated by the dashed line enclosing said two computing units. Both analog signals and digital signals are transmitted from the rail pressure sensor 13 to the control unit 17. Said signals have different time constants, wherein the analog signals have a short time constant of for example 0.124 ms and the digital signals have a long time constant of for example 1 ms.

The transmission of the analog signals ensures very accurate timing in the control unit 17 of high resolution pressure values that are particularly required in diesel applications for controlling the injection system. By an analysis of the digitally transmitted differential rail pressure signals, which also takes place in the control unit 17, the presence of a malfunctioning rail pressure sensor can be detected.

As said differential rail pressure signal is already detected in the rail pressure sensor, the rail pressure measurement values, which are used to form the differential rail pressure signal, can be rail pressure measurement signals that are available in the rail pressure sensor at the same time or rail pressure measurement values that are determined at the same time using the two rail pressure measurement devices. Consequently, there is no time shift between the rail pressure measurement values used for rail pressure differentiation. As a result, the safety or reliability of detection of a malfunctioning rail pressure sensor is increased in comparison to the prior art, in which a signal comparison is only carried out in the control unit and thereby for pressure values that are acquired with a time offset owing to the different signal transition times of analog and digital signals.

In particular, a fault detected during the analysis of two rail pressure measurement signals compared with each other although there is in fact no fault, owing to different transmission times of analog and digital signals, is prevented. In particular, during a comparison of the signals that are to be compared with each other in the control unit, depending on the dynamics of the signal change asynchronous pressure measurement values would be compared with each other, which can result in undesirable errors in the detection. In addition, if said comparison is carried out in the control unit, the different signal paths of the two signals that are to be compared with each other must then be taken into account, which in principle again results in a measurement value shift. For example, during the analog transmission, electromagnetic noise, errors caused by line resistances, errors caused by the necessary A/D conversion and errors caused by signal filtering occur, which can cause measurement value errors.

The digital signal transmission may be used to transmit further signals from the rail pressure sensor 13 to the control unit 17 on the digital transmission path. As a result, for example the possibility of a manipulation lock can be offered, by means of which tuning of the rail pressure sensor for the purpose of a non-permitted engine performance increase can be prevented or at least detected.

What is claimed is:

1. A method for detecting a malfunctioning rail pressure sensor, the method comprising:
   delivering an analog output signal of the rail pressure sensor characterizing the rail pressure to a control unit;
   generating a differential rail pressure signal by the rail pressure sensor as a digital output signal;
   delivering the differential rail pressure signal of the rail pressure sensor to the control unit;
   analyzing the analog output signal and the differential rail pressure signal in the control unit; and
   detecting a malfunctioning rail pressure sensor based on the analysis by the control unit.

2. The method as claimed in claim 1, further comprising: comparing the transmitted differential rail pressure signal with a predetermined threshold value in the control unit; and
   detecting the presence of a malfunctioning rail pressure sensor if the transmitted differential rail pressure signal exceeds the predetermined threshold value.

3. The method as claimed in claim 1, wherein the rail pressure sensor generates the differential of the output signals of two rail pressure measurement values, each output by a rail pressure measurement device.

4. The method as claimed in claim 3, wherein the rail pressure sensor generates the differential of the output signals of two rail pressure measurement values detected at the same time.

5. An apparatus for detecting a malfunctioning rail pressure sensor, the apparatus comprising:
   a rail pressure sensor; and
   a control unit connected to the rail pressure sensor; wherein
   the rail pressure sensor comprises a first rail pressure measurement device generating an analog signal and a second rail pressure measurement device generating a digital signal, both signals characterizing the rail pressure; and
   the control unit receives and analyzes the analog signal output and the digital signal output;
   the rail pressure sensor further comprises a rail pressure differentiator forming a differential rail pressure signal from the output signal of the first rail pressure measurement device and the output signal of the second rail pressure measurement device;

the rail pressure sensor delivers the differential rail pressure signal as a digital signal to the control unit; and the control unit analyzes the differential rail pressure signal.

6. The apparatus as claimed in claim 5, wherein that the first and the second rail pressure measurement devices each comprise a measurement transducer.

7. The apparatus as claimed in claim 5, wherein the first and the second rail pressure measurement devices each comprise an ASIC.

8. The apparatus as claimed in claim 5, wherein the rail pressure sensor comprises a digital to analog converter connected to the output of the first rail pressure measurement device and providing the analog signal output.

9. The apparatus as claimed in claim 5, wherein the control unit comprises:

a filter;

an analog to digital converter connected to the output of the filter; and a computing unit analyzing the received analog signal.

10. The apparatus as claimed in claim 5, wherein the control unit comprises a computing unit analyzing the differential rail pressure signal.

11. The apparatus as claimed in claim 10, wherein the computing unit compares the differential rail pressure signal with a predetermined threshold value and detects the presence of a malfunctioning rail pressure sensor if the differential rail pressure signal exceeds the predetermined threshold value.

* * * * *